J. R. McALISTER.
Sleigh-Brake.
No. 59,244.  Patented Oct. 30, 1866.
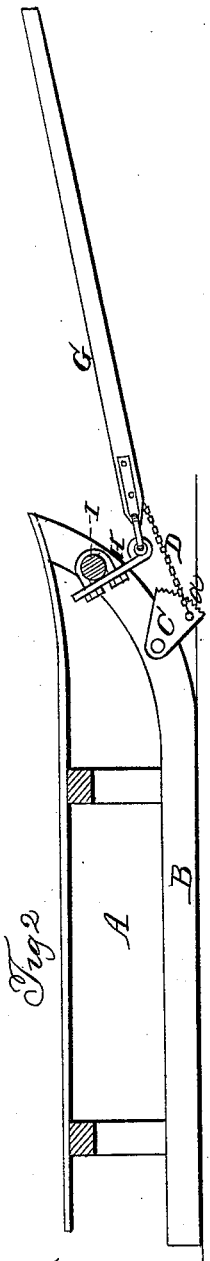
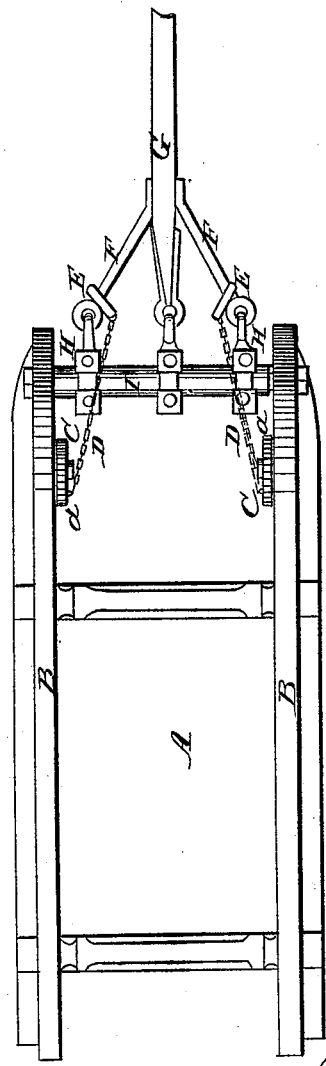
Witnesses:
F. A. Jackson
J. A. Service
Inventor;
J. R. McAlister
Per Munn & Co.
Attorneys

UNITED STATES PATENT OFFICE.

J. R. McALISTER, OF RICHVILLE, NEW YORK.

IMPROVEMENT IN SLEIGH-BRAKES.

Specification forming part of Letters Patent No. 59,244, dated October 30, 1866.

*To all whom it may concern:*

Be it known that I, J. R. McALISTER, of Richville, in the county of St. Lawrence and State of New York, have invented a new and useful Improvement in Sleigh or Sled Brakes; and I do hereby declare that the following is a full, clear, and exact description thereof, which will enable others skilled in the art to make and use the same, reference being had to the accompanying drawings, forming part of this specification.

The present invention consists in so hanging brake blocks or shoes to the runner-frames of a sleigh or sled, and in so connecting them to the pole of the same, that while they will not bear or act upon the surface of the ground when the sleigh or sled is being backed, they will come to a bearing against the ground if the sleigh is descending an inclination or a hill, whether it be more or less steep, as will be obvious from the following detail description of the same, reference being had to the accompanying plate of drawings, in which—

Figure 1 is a plan view of the under side of a sleigh or sled having my improved arrangement of brakes applied thereto; and Fig. 2, a side elevation of my arrangement of the brake-shoes and hanging of the pole, with the sleigh or sled frame in vertical section.

A in the drawings represents a sleigh or sled, which may be made of any of the usual styles and of any suitable construction; B, the runners of the same, on the inside of each of which are hung brake shoes or blocks C, that are made of a sector shape, with their curved sides $a$ toothed or serrated. To each brake-shoe C, at one end, a chain, D, is hung, that, by means of eyes or loops E of their other ends, are hung to and upon the side pieces or rods, F, secured to the pole G at or near its inner end. This pole G, by its inner end, as well as, also, by its side rods, F, is hung to one end of clips H, fastened to and upon a roller, I, extending across the sleigh between its two runner-frames, in each of which it is hung so as to turn, the whole construction and arrangement being plainly shown in the drawings.

From the manner in which the brake-shoes are connected to the pole of the sled, and the pole in its turn hung to the roller I, susceptible of turning, it is plain to be seen that when the sled is backed its brake-shoes will not come to a bearing against the surface of the ground, thus not affording the least hinderance to the backward movement of the sled, while if the sled is descending a declivity or an inclination more or less steep, the said brake-shoes will then act upon the ground, as is obvious without any further explanation.

Having thus described my invention, I claim as new and desire to secure by Letters Patent—

The brake-shoes C and chains D, connecting them to the pole G, hung to the roller I, turning in the sled-frame, when combined and arranged together substantially in the manner and for the purpose described.

J. R. McALISTER.

Witnesses:
 CHAS. R. WALTER,
 H. D. PAGE.